United States Patent
Wu et al.

(10) Patent No.: US 10,759,110 B2
(45) Date of Patent: Sep. 1, 2020

(54) LIGHT HOMOGENIZATION METHOD FOR MULTI-SOURCE LARGE-SCALE SURFACE EXPOSURE 3D PRINTING

(71) Applicant: Beijing University of Technology, Beijing (CN)

(72) Inventors: Lifang Wu, Beijing (CN); Lidong Zhao, Beijing (CN); Jiankang Qiu, Beijing (CN); Xiaohua Guo, Beijing (CN); Meng Jian, Beijing (CN); Ziming Zhang, Beijing (CN)

(73) Assignee: Beijing University of Technology, Beijing (CN)

( * ) Notice: Subject to any disclaimer, the term of this patent is extended or adjusted under 35 U.S.C. 154(b) by 6 days.

(21) Appl. No.: 16/316,477

(22) PCT Filed: Nov. 17, 2016

(86) PCT No.: PCT/CN2016/106282
§ 371 (c)(1),
(2) Date: Jan. 9, 2019

(87) PCT Pub. No.: WO2018/090297
PCT Pub. Date: May 24, 2018

(65) Prior Publication Data
US 2019/0291341 A1   Sep. 26, 2019

(51) Int. Cl.
*B29C 64/129* (2017.01)
*B29C 64/393* (2017.01)
(Continued)

(52) U.S. Cl.
CPC .......... *B29C 64/129* (2017.08); *B29C 64/291* (2017.08); *B29C 64/393* (2017.08);
(Continued)

(58) Field of Classification Search
CPC .................................................... B29C 64/129
See application file for complete search history.

(56) References Cited

U.S. PATENT DOCUMENTS 6,383,719 B1 *  5/2002  Bula ........................ G03F 7/203
                                                               430/312
6,416,908 B1 *  7/2002  Klosner ..................... G03F 7/24
                                                                355/47
(Continued)

FOREIGN PATENT DOCUMENTS

CN    105856568 A       8/2016
CN    106127842 A  *  11/2016
(Continued)

OTHER PUBLICATIONS

European Patent Office: Supplementary European Search Report for European Patent Application No. EP16922002.7; dated Dec. 20, 2019.
(Continued)

*Primary Examiner* — Gandhi Thirugnanam
(74) *Attorney, Agent, or Firm* — McDonnell Boehnen Hulbert & Berghoff LLP

(57) ABSTRACT

A light homogenization method for multi-source large-scale surface exposure 3D printing, comprising the following steps: projecting pure-color images of a first color and a second color having identical attributes capturing an image of an overlapping portion and calculating height and width information of the overlapping portion; splitting a pre-processed slice and respectively recording width and height information of two slices resulting from the splitting and generating two grayscale images having identical attributes thereto; counting power values of identical positions of slices in different grayscale values, performing a further calculation to obtain a projection mapping function, using the projection mapping function as a basis for performing
(Continued)

optimization on grayscale interpolation of the generated images; and fusing the processed grayscale images and the originally split two slices to obtain a surface exposure 3D printing slice having a uniform brightness in final shaping.

11 Claims, 5 Drawing Sheets

(51) Int. Cl.
  *B29C 64/291* (2017.01)
  *G06T 15/04* (2011.01)
  *G06T 15/10* (2011.01)
  *G06T 15/50* (2011.01)
  *G06T 15/00* (2011.01)
  *B33Y 10/00* (2015.01)
  *B33Y 50/02* (2015.01)

(52) U.S. Cl.
  CPC .............. *G06T 15/00* (2013.01); *G06T 15/04* (2013.01); *G06T 15/10* (2013.01); *G06T 15/50* (2013.01); *B33Y 10/00* (2014.12); *B33Y 50/02* (2014.12)

(56) References Cited

U.S. PATENT DOCUMENTS

| | | | |
|---|---|---|---|
| 6,934,052 B2 * | 8/2005 | Venable | H04N 1/387 358/1.12 |
| 2004/0159396 A1 * | 8/2004 | Murase | H01L 21/486 156/292 |
| 2006/0100734 A1 * | 5/2006 | Huang | B29C 64/153 700/119 |
| 2008/0021586 A1 * | 1/2008 | Schillen | B33Y 50/02 700/120 |
| 2008/0038396 A1 * | 2/2008 | John | G03F 7/2022 425/174.4 |
| 2014/0098092 A1 * | 4/2014 | Isokawa | G06T 7/0012 345/419 |
| 2016/0303797 A1 * | 10/2016 | Moran | B29C 64/135 |
| 2019/0291341 A1 * | 9/2019 | Wu | G06T 15/00 |

FOREIGN PATENT DOCUMENTS

| | | | | |
|---|---|---|---|---|
| CN | 106127842 A | 11/2016 | | |
| EP | 3543957 A4 * | 1/2020 | ............. | G06T 15/50 |
| WO | 2016173100 A1 | 11/2016 | | |

OTHER PUBLICATIONS

International Searching Authority—State Intellectual Property Office of the P.R. China, International Search Report for international application No. PCT/CN2016/106282 dated Aug. 18, 2017, (English translation provided).

* cited by examiner (a)

(b)

(a)

(b)

LIGHT HOMOGENIZATION METHOD FOR MULTI-SOURCE LARGE-SCALE SURFACE EXPOSURE 3D PRINTING

TECHNICAL FIELD

The invention relates to a technology of intelligent control and image processing, and in particular to a method of handling pictures output from projectors. By optimizing the slices using multiple projectors based on the number projectors, thereby large scale mask projection 3D printing using multiple projectors and energy homogenization optimization for the large scale mask projection 3D printing using multiple projectors.

BACKGROUND ART 3D printers were born in the mid 1980s, and were first invented by American scientists. A 3D printer is an apparatus that uses 3D printing technology to produce a device of the real object. The basic principle for 3D printing is using special materials (resin or powder, etc.) to manufacture real 3D models that are designed in computer, and by aggradation of the binder, each layer of printing material are bobbed to form the designed shape, and the 3D objects are finally printed out. The rapid prototype manufacturing technology is widely applied in the model manufacture in the stage of product development because of the fast manufacturing and low cost. 3D printing is a kind of rapid prototyping technology. It first transfers the objects into 3D data, and then uses the adhesive materials such as powdered metal, plastic and so on to print them layer by layer. The model manufacturing and industrial design are used to build models. They are now becoming product manufacturing and forming "Direct Digital Manufacturing." A variety of the rapid manufacturing technologies have been developed such as the Stereo Lithography Appearance (SLA), the Laminated Object Manufacturing (LOM), the Fused Deposition Modeling (FDM), the Selective Laser Sintering (SLS), the Three-Dimensional Printing (3DP), and the Digital Light Procession (DLP) etc. However, in the current situation, the accuracy of FDM is poor, and it is necessary to continuously melt the material wire and wait for the material to cure, and the overall molding speed is slow. The SLA technology is limited by the optical characteristics of galvanometers. Generally, the galvanometer-type printing surface is less than 300 mm*300 mm. Area dynamic focusing system is required if the size of the printing area is more than 300 mm*300 mm. and it will greatly raise the cost. The principle of the galvanometer system determines that the larger the printing area, the longer the focal length, and the larger the spot, the more laser energy is wasted. The DLP technology is similar to a projector's principle, in which the most important component is the DMD chip. The biggest advantage of DLP is that it can be exposed layer by layer. Theoretically, it is very fast. However, if a larger printing area is required and the high power density of the curing light is required simultaneously, the light intensity must be greatly increased, but the DMD cannot withstand the high light intensity, and the heat dissipation of the system becomes a serious problem if the light intensity increases. Therefore, 3D printing based on DLP technology developed slowly in the direction of large printing area.

Because the energy radiated from each DLP projector is non-uniform light energy, using multiple projectors will inevitably cause uneven distribution of the illumination intensity on each projectors, and it will also affect the overlapped area on the printing area, and aggravate the non-uniformity of the energy.

SUMMARY OF THE DISCLOSURE

An embodiment of the invention provides an energy homogenization method for large scale mask projection 3D printing using multiple projectors. The method of slice processing for mask projection using two projectors will be introduced. Thus, the output energies can be homogenized by adjusting the images of the projectors. Meanwhile, it can easily be extended to larger sizes.

To solve this technical problem, the invention provides an energy homogenization method for multiple-projector large-scale mask projection 3D printing, the method comprising the steps of:

Step 100: using at least two projectors as a light-source for mask projection, and locating the projectors to be adjacent to each other so that there is an overlapped area between the projection areas of the projectors, wherein the two projectors project two images with the same property but with different pure colors, a first color and a second color, and the overlapped area between the projection areas of the projectors has a third color; then, using a camera to capture an image of the projection areas and the overlapped area, and analyzing the image using a computer, wherein the height and width of the overlapped area are denoted as $H_0$ and $W_0$ respectively;

Step 200: based on the information of the height $H_0$ and the width $W_0$ of the overlapped area, segmenting a preprocessed slice which is obtained from the captured image to create two slices which are denoted as $P_1$ and $P_2$ respectively; recording the width $W_1$ and $W_2$ and the $H_1$ and $H_2$ of the two slices $P_1$ and $P_2$; and then generating two corresponding gray leveled pictures $P_3$ and $P_4$ having the same property with the two slices;

Step 300: measuring the output energy at the same position on a printing area with discrete gray levels; by analyzing the measured data, obtaining a mapping function $T[r(x,y)]$ by using curve fitting; and based on the mapping function $T[r(x,y)]$, optimizing the generated pictures $P_3$ and $P_4$ using gray level interpolation; and Step 400: fusing the pictures $P_3$ and $P_4$ treated above with the two slices $P_1$ and $P_2$ to generate a series of 3D printed slices with energy homogenization.

According to a possible embodiment, Step 100 comprises the substeps of:

testing and adjusting the levelness of the projectors by using a leveler so that the projectors have same projection orientation; then fixing these projectors so that their relative position is invariable;

activating the projectors to project images with different pure colors so that the overlap area between them has the third color which is a mixture of the two pure colors and can be identified by a computer; and using the camera to capture the image of the projection areas, including the areas with the two pure colors and that with the mixed color; obtaining details of the overlapped area based on the differences between image pixels; and recording the height and width of the overlapped area as $H_0$ and $W_0$ respectively.

According to a possible embodiment, Step 200 comprises the substeps of:

zooming the slices to the size of the printing area with the invariable aspect ratio, and recording the height and width of the whole slice as H and W respectively;

segmenting the slice based on the height $H_0$ and width $W_0$ of the overlapped area, recording the segmented slices as $P_1$ and $P_2$, and recording their widths as $W_1$ and $W_2$ and their heights as $H_1$ and $H_2$; and generating two gray leveled images $P_3$ and $P_4$ with the same gray levels attributes with $P_1$ and $P_2$ based on the widths and heights of the two segmented slices $P_1$ and $P_2$.

According to a possible embodiment, in Step 300:

for the power value at the same position with different gray levels, the complete projection mapping function is obtained through Fourier series curve fitting:

$$T[r(x,y)]=a_0+a_1*\cos(r(x,y)*w)+b_1*\sin(r(x,y)*w)$$

wherein r(x, y) is the gray level at location (x, y), w is angular frequency, and $a_0$ and $a_1$ are constants.

According to a possible embodiment, according to the relationship of the overlapped area and projection mapping function of gray leveled images $P_3$, $P_4$, the illumination energy in the printing area of the gray leveled images $P_3$, $P_4$ are determined based on the following energy homogenization formula:

$$\begin{cases} r'(x,y) = \text{argmin}\left(\sum_{(x,y)\in S_{max}} (f(T_1[r_1(x,y)]+T_2[r_2(x,y)])-f)^2 - f\right) \\ f(T_1+T_2) = \begin{cases} T_1[r_1(x,y)]_{(x,y)\in S_1} \\ T_2[r_2(x,y)]_{(x,y)\in S_2} \\ T_1[r_1(x,y)]_{(x,y)\in S_3} + T_2[r_2(x,y)]_{(x,y)\in S_3} \end{cases} \end{cases}$$

wherein section S1 is defined as an area that belongs to gray image $P_3$ without overlapped with $P_4$, section S2 is defined as an area that belongs to gray images $P_4$ without overlapped with $P_3$, section $S_3$ is defined as the overlapped area between gray images $P_3$ and $P_4$, $S_{max}$ is the maximum exposure area, and f is the average energy in the whole exposure area.

According to a possible embodiment, for the energy homogenization formula, illumination unevenness of the exposure areas in sections $S_1$, $S_2$ and $S_3$ is reduced in the following way:

1) dividing sections $S_1$, $S_2$ and $S_3$ into M×N image sub-blocks respectively; for sections $S_1$ and $S_2$, using areas in the slice image as exposable areas; finding corresponding energy values from the obtained sub-areas of the image of the candidate area for exposure area; and selecting the minimum energy value as the optimal target energy value in the exposure area;
2) obtaining the illumination energy corresponding to the gray value of each pixel at the boundary of sections $S_1$ and $S_3$, and storing it in an array "A"; obtaining the illumination energy corresponding to the gray value of each pixel of the boundary of sections $S_2$ and $S_3$, and storing it in an array "B"; establishing two linear equations reflecting the change in the height or width in sections $S_3$; and determining the energy value of each position in section $S_3$ based on the combination of the energy values of the two linear equations at the same position.

According to a possible embodiment, after the energy value of each position in the third section $S_3$ is determined, linear interpolation is performed in sections $S_1$ and $S_2$ respectively so that two gray level images with smooth gray changes are obtained.

According to a possible embodiment, in Step 400:

the gray value of each pixel in the interpolated gray level image is sequentially scanned; the next pixel is skipped if the gray level value is zero; if the gray value is greater than zero, the gray value of the pixel is obtained, and then the gray value is assigned to the same pixel position of the original image slice; and finally, the pixels of the segmented slices $P_1$ and $P_2$ are distributed in gray levels to satisfy the pixel gray distribution of the gray images $P_3$ and $P_4$, respectively.

According to a possible embodiment, by using a plurality of projectors of the same energy distribution as light sources of the mask projection 3D printer, Steps 100 to 400 and the corresponding sub-steps are performed for every two projectors adjacent in the height direction or/and in the width direction.

In an embodiment in which a plurality of projectors of the same energy distribution as light sources of the mask projection 3D printer, for the energy values of the projected gray level images in the same position in different gray levels values, a complete projection mapping function is obtained through Fourier series curve fitting:

$$T[r(x,y)]=a_0+a_1*\cos(r*w)+b_1*\sin(r*w)$$

wherein r(x, y) is a gray image at location (x, y), w is the angular frequency, and $a_0$ and $a_1$ are constants.

In an embodiment in which a plurality of projectors of the same energy distribution as light sources of the mask projection 3D printer, the illumination power in the exposable areas of each slice is determined according to the relationship of the intersection positions of the slices and the projection mapping function and based on the following light power formula:

$$\begin{cases} r'(x,y) = \text{argmin}\left(\sum_{(x,y)\in S_{max}} \left(f\left(\sum_{i=1}^n T_n[r_n(x,y)]\right)-f\right)^2 - f\right) \\ f\left(\sum_{i=1}^n T_n[r_n(x,y)]\right) = \begin{cases} T_n[r_n(x,y)]_{(x,y)\in S_n} \\ \sum_{i=1}^n T_n[r_n(x,y)]_{(x,y)\in S_m} \end{cases} \end{cases}$$

wherein f is the average energy at the locations in the printing area, $S_n$ is the sections without overlap, and $S_m$ is the overlapped section between the projectors.

The features of other aspects in the embodiment using more than two projectors as mask projection 3D printer's light sources are similar to those in the embodiment using two projectors as mask projection 3D printer's light sources.

An embodiment of the invention provides an energy homogenization method for large scale mask projection 3D printing using multiple projectors has the following advantages:

1) Improve the scale of exposure area;
2) Portability—when the projection mapping function of different light sources is acquired, the method can be easily transplanted;
3) Printability—this method of energy homogenization of multi-source large-scale mask projection 3D printing can be applied to most models that do not need to be optimized. It has strong applicability and high success rate of one-time printing. Therefore, the present invention has a certain application value and significance.

DETAILED DESCRIPTION OF PREFERRED EMBODIMENTS

Some embodiments of the disclosure will be described with reference to the drawings. It should be noted that, various embodiments and various features of the embodiments of the disclosure can be implemented in combination in the condition that no confliction is caused.

The invention provides an energy homogenization method for large scale mask projection 3D printing using multiple projectors. By dealing with each slice, the interference is reduced and large-area exposure is achieved. The large area mentioned is determined by the number of specific projections, i.e., the width and height are considered to be at least 280 mm×280 mm.

Figure 1:
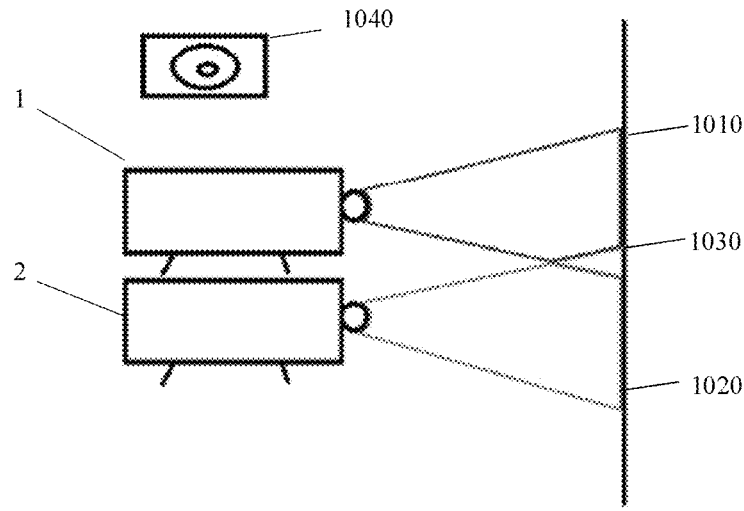
FIG. 1 is a schematic diagram of 3D printing, which takes two projectors as example.

The mask projection 3D printer mainly uses a digital light processing (DLP) projector as a light source, and the most important component in the projector is a digital micromirror device (DMD) to complete the visual digital information display technology. Specifically, DLP projection technology uses DMD chips as the primary key processing element to implement digital optical processing. However, if a larger surface is required and the high power density of the curing light is to be satisfied at the same time, the light intensity must be greatly increased. But DMD does not withstand the high light intensity. At the same time, the light intensity increases, the system cooling problem is serious. Therefore, the current 3D printing based on DLP technology is developing slowly in the processing format. Therefore, we have designed an algorithm for large-area mask projection printing in which multiple projectors as the light sources of mask projection 3D printer are used for exposure, which solves the problem of splicing between slices that are projected by each projector. FIG. 1 a schematic diagram of 3D printing, which takes two projectors for example. This schematic diagram uses two projectors 1 and 2 as examples. Wherein, the upper slice 1010 is projected by the upper projector, the lower slice 1020 is projected by the lower projector, the overlapping portion 1030 is located in the overlapped area, and the camera is 1040.

Here, it should be pointed out that, for the convenience of description, in the example shown in the figure, two projectors 1, 2 are stacked one above the other to produce an upper slice, a lower slice, and an overlapped area between them. It is understood that the principle of the present invention is also applicable to the case where two projectors are overlapped on the left and right sides to generate a left half of the slice, a right half of the slice, and an overlapped area between them. It will also be understood that the principles of the present invention are also applicable to multiple projector combinations. For a large width and height, it may be necessary to put two or more projectors in the width and height directions together to implement the mosaic effect of the multi-source exposure surface. The projectors are preferably arranged in a matrix, and there are overlapped areas between the adjacent slices (left and right) (i.e., in the widthwise direction) and the adjacent slices (up and down) (i.e., in the height direction).

The drawings are used to explain the basic principle of the present invention. It is described for the examples of two projectors placed side by side in the figures. It can be understood that the described features are also applicable to projectors arranged in other ways or other numbers of projectors.

Figure 2:
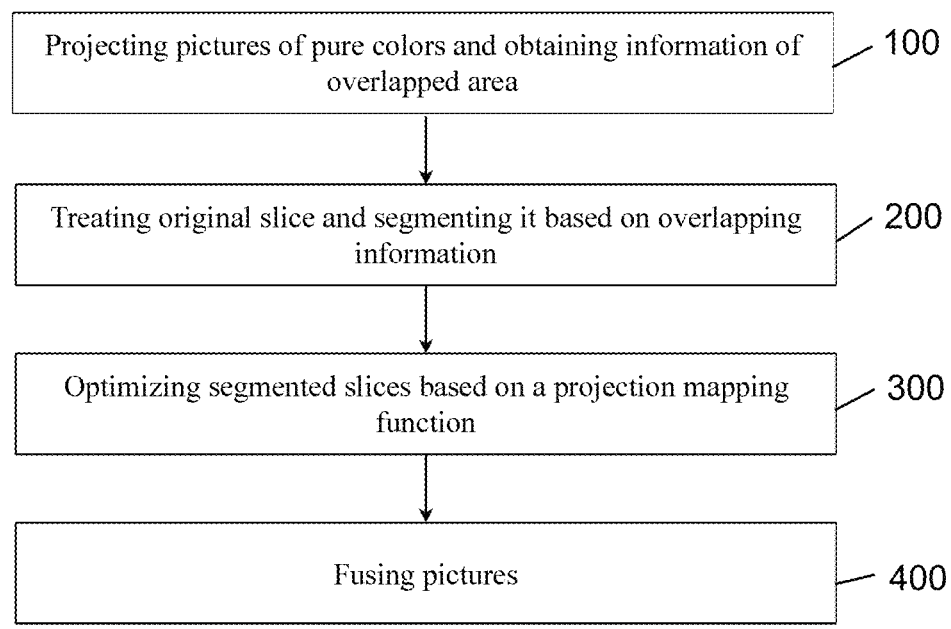
FIG. 2 is a flow chart of the energy homogenization method for large scale mask projection 3D printing using multiple projectors of the present invention.

FIG. 2 is a flow chart of an energy homogenization method for large scale mask projection 3D printing using multiple projectors for the embodiment shown in FIG. 1.

The invention provides an energy homogenization method for large scale mask projection 3D printing using multiple projectors, includes:

Step 100: Ensure that two projectors of the same specification are placed side by side under the condition of just full contact. Two projectors output images with red and green respectively. The upper image is red and the down image is green. And the overlapped region is the yellow. Using a camera to capture the image of the projection area and the overlapped area could be obtained by analyzing the image using computer, the height and width of the overlapped areas are denoted as $H_0$ and $W_0$ respectively;

Step 200: According to the information of the overlapped region, and segment the preprocessed slice. And the two slices can be denoted as $P_1$ and $P_2$. Meanwhile, width and height of the $P_1$ and $P_2$ are denoted as $W_1$ and $W_2$, $H_1$ and $H_2$ respectively. Then two gray leveled images $P_3$ and $P_4$ are generated with the same properties of $P_1$ and $P_2$.

Step 300: Measuring the output energy at the same position with some discrete gray levels. By analyzing the statistic data, the mapping function $T[r(x, y)]$ is acquired by using curve fitting. Based on the mapping function $T[r(x, y)]$, the power value of gray leveled pictures at the same position with different gray levels is calculated. The generated pictures $P_3$ and $P_4$ are optimized based on the projection mapping functions.

Step 400: When pictures $P_3$ and $P_4$ have been completed, fusing $P_3$ (and $P_4$) with $P_1$ and ($P_2$), so the slices with energy homogenization are generated.

Among them, the processing Step 100 includes:

Substep 110: The levelness of projector 1 and projector 2 is tested by using the leveler, so that the projectors have same projection orientation. The projector 1 and projector 2 are fixed so that their relative position is invariable.

Substep 120: Let the two projectors 1 and 2 respectively project red and green pure color images. Because the two projectors are placed in a stack, the projection areas must overlap, allowing one projector to project a red image and one to project a green image. This ensures that the overlapping area is yellow and is easily recognized by the computer. Making these projectors project a different pure color image and try to make the overlapped area easily to identify.

Substep 130: Using a camera to capture the image of the projection area including the areas with two pure color and the mixed color. Based on the differences between image pixels, the detail of the overlapped area are easily obtained. The height and width of the overlapped area are denoted as $H_0$ and $W_0$ respectively.

Further, Step 200 includes:

Substep 210: Zooming the slices to the size of the printing area with the invariable aspect ratio. In addition, the exposed parts of the slices should have same size of projectors' project image. And record the whole slice's height as H, and the width is W.

Substep 220: According to the height $H_0$ and width $W_0$ of the overlapped area, the slices will be segmented using the following formula. And the segmented slices are denoted as $P_1$ and $P_2$. Their widths are $W_1$ and $W_2$, and heights are $H_1$ and $H_2$:

$$H_1 = H_2 = H/2 + H_0 \quad (1)$$

$$W = W_0 = W_1 = W_2 \quad (2)$$

Figure 3:
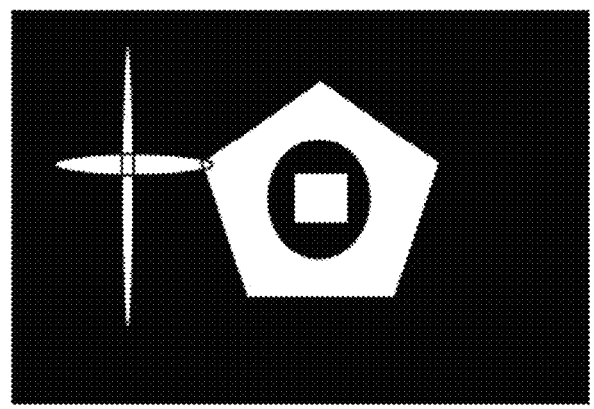
FIG. 3 (*a*) shows the original slice, and (*b*) shows the upper and lower parts of the slices after segmentation.
Figure 3:
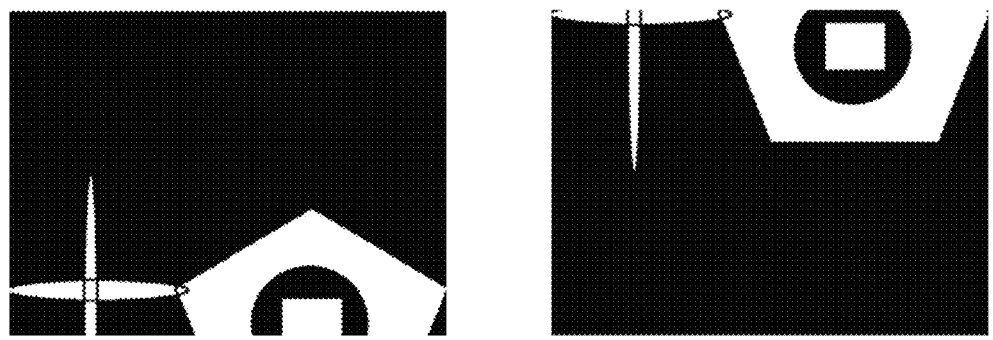
Figure 4:
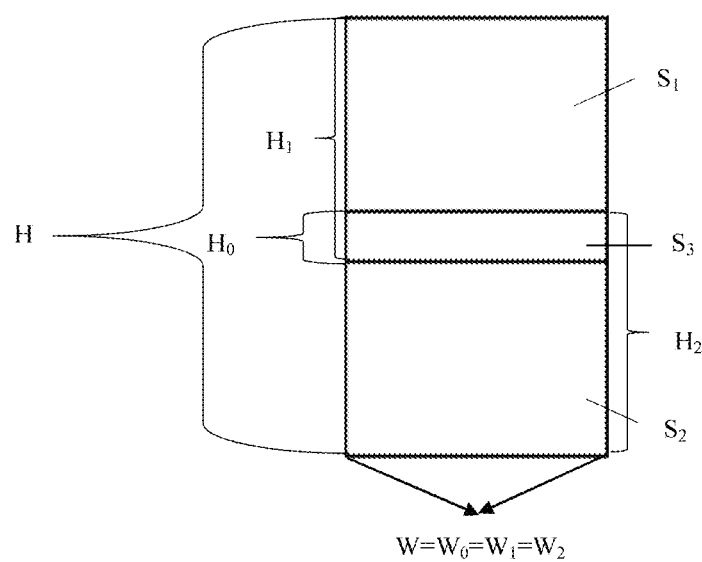
FIG. 4 is an illustration of labeling information in the projection image.

Among them, FIG. 3(*a*) shows the original slice, and (*b*) shows the upper and lower parts of the slices after segmentation, and FIG. 4 is illustration of labeling information in the projection image.

Substep 230: According to the width and height of $P_1$ and $P_2$ in the two sections after segmentation, two gray leveled images $P_3$ and $P_4$ are generated with the same gray levels attributes of $P_1$ and $P_2$.

Figure 5:
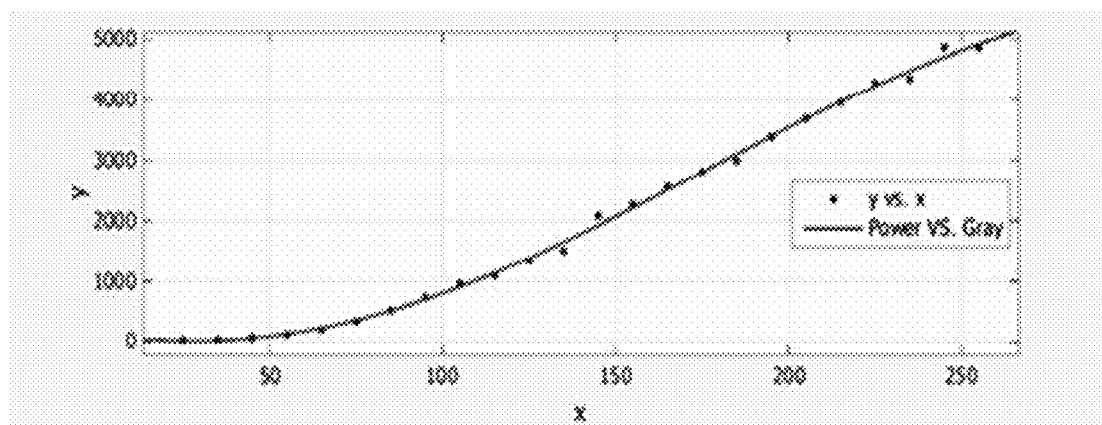
FIG. 5 is an illustration of the projection mapping function curve fitting.

Further, Step 300 includes:

Substep 310: Measuring the output energy at the same position with some discrete gray levels and find that the energy distribution of the projector is similar at different gray levels at the same position, after further fitting experiments, it was found that the power is non-linearly changing and the law conforms to the Fourier series fitting distribution. The confidence interval is 95%. A complete projection mapping function can be obtained by curve fitting:

$$T[r(x,y)] = a_0 + a_1 * \cos(r*w) + b_1 * \sin(r*w) \quad (3)$$

where r(x, y) is the corresponding brightness of the picture at different positions. FIG. 5 is illustration of the projection mapping function curve fitting. In the above equation, the r represents the gray levels, the w represents the angular frequency, and both the $a_0$ and the $a_1$ represent constants.

Substep 320: According to the relationship between the intersecting positions of the pictures $P_3$ and $P_4$ and the projection mapping function, the expression of the problem shown in the following formula can be obtained. To solve the problem of uneven distribution of illumination energy in the exposable areas (including overlapping areas) of the pictures $P_3$ and $P_4$. The portion that belongs to the picture $P_3$ and does not intersect with the picture $P_4$ is the first portion $S_1$, the portion that belongs to the picture $P_4$ and does not intersect with the picture $P_3$ is the second portion $S_2$, and the portion that overlaps with the pictures $P_3$ and $P_4$ is the overlapping portion $S_3$, and the $S_{max}$ is the maximum exposure area, as follows:

$$\begin{cases} r'(x,y) = \mathrm{argmin}\left( \sum_{(x,y) \in S_{max}} (f(T_1[r_1(x,y)] + T_2[r_2(x,y)]) - f)^2 - f \right) \\ f(T_1 + T_2) = \begin{cases} T_1[r_1(x,y)]_{(x,y) \in S_1} \\ T_2[r_2(x,y)]_{(x,y) \in S_2} \\ T_1[r_1(x,y)]_{(x,y) \in S_3} + T_2[r_2(x,y)]_{(x,y) \in S_3} \end{cases} \end{cases} \quad (4)$$

where f is the average energy in the whole exposure area, and the number of light sources involved is greater than the case where two units are n, the expression of the problem can also be written as follows:

$$\begin{cases} r'(x,y) = \mathrm{argmin}\left( \sum_{(x,y) \in S_{max}} \left( f\left(\sum_{i=1}^n T_n[r_n(x,y)]\right) - f \right)^2 - f \right) \\ f\left(\sum_{i=1}^n T_n[r_n(x,y)]\right) = \begin{cases} T_n[r_n(x,y)]_{(x,y) \in S_n} \\ \sum_{i=1}^n T_n[r_n(x,y)]_{(x,y) \in S_m} \end{cases} \end{cases} \quad (5)$$

where $S_n$ denotes the portion of each projector that does not overlap with other projectors, and $S_m$ denotes the overlap between the projectors, as the number of projectors is multiplied, the number of areas where the exposure of the projector overlaps is also increasing, and each overlapping part may be generated by overlapping the projections of adjacent projectors in the width direction and/or height direction.

Substep 330: In order to solve the problem of unequal illumination in the exposable area of each section $S_1$, $S_2$, and $S_3$, in formula 4, we use the following method to meet the requirements of the above formula to solve the problem:

1) sections $S_1$, $S_2$, and $S_3$ are divided into M×N image sub-blocks respectively. For sections $S_1$ and $S_2$, the areas in the slice image are used as exposable areas. Finding the corresponding energy from the obtained sub-areas of the image of the candidate area for exposure area. and the minimum energy is selected as the optimal target energy in the exposure area;
2) Get the lower boundary of the first part $S_1$ (that is, the boundary that falls in the second part $S_2$). The illumination energy corresponding to the gray value of each pixel is stored in the array A. Obtain the upper boundary of the second portion $S_2$ (that is, the boundary that falls in the first portion $S_1$). The illumination energy corresponding to the gray value of each pixel is stored in the array B. When $W_1 = W_2$, two linear equations with the slopes of $K_1$ and $K_2$ with the height change in the overlap area $S_3$ as independent variables are respectively established, where $K_1$ and $K_2$ are respectively represented as:

$$K_1 = a[W_1]/(H_1 - H_0) \quad (6)$$

$$K_2 = -b[W_2]/(H_0 - H_2) \quad (7)$$

According to the superposition of the power values of these two linear equations at the same position, it is the power value of each position in the overlapping portion $S_3$ area.

It is understood that for the case where two projectors are placed side by side in the width direction, a linear equation with two slopes can be separately established with the variation of the width in the area of the overlapping portion $S_3$ as an independent variable.

For the case where the number of light sources is larger than two projectors, the overlapping portion $S_3$ may be a superposition of projection images of three or even four projectors. In this regard, linear equations with three or four slopes can be established for the variation of height and width in the area of overlap $S_3$ as independent variables, respectively, then, based on the superposition of the energy values of the three or four linear equations at the same position, the energy value at each position of the overlapping portion $S_3$ is obtained.

Figure 6:
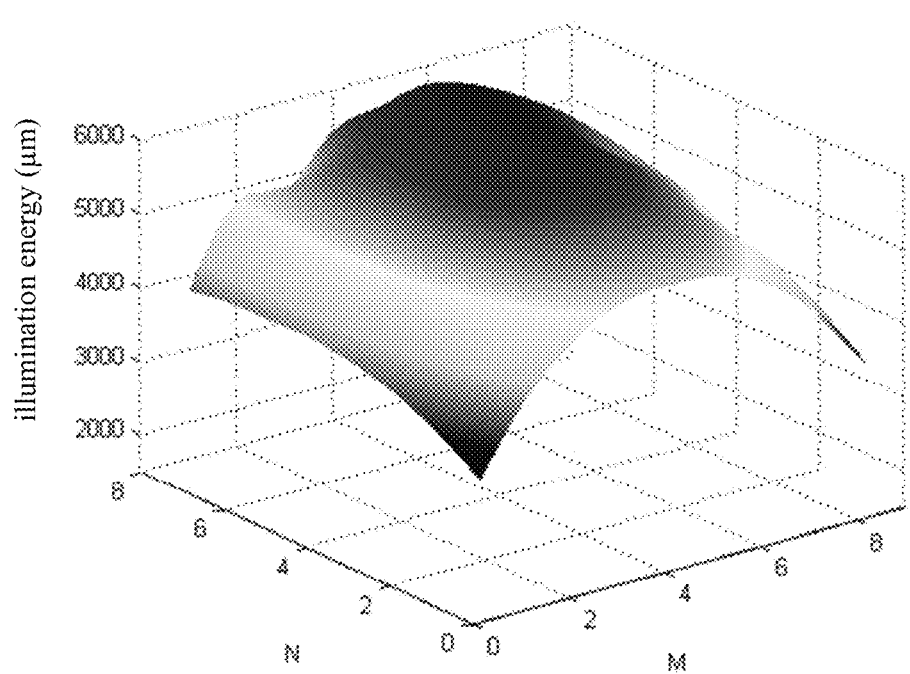
FIG. 6 shows the energy distribution of a projector for the image gray level of 255.
Figure 7:
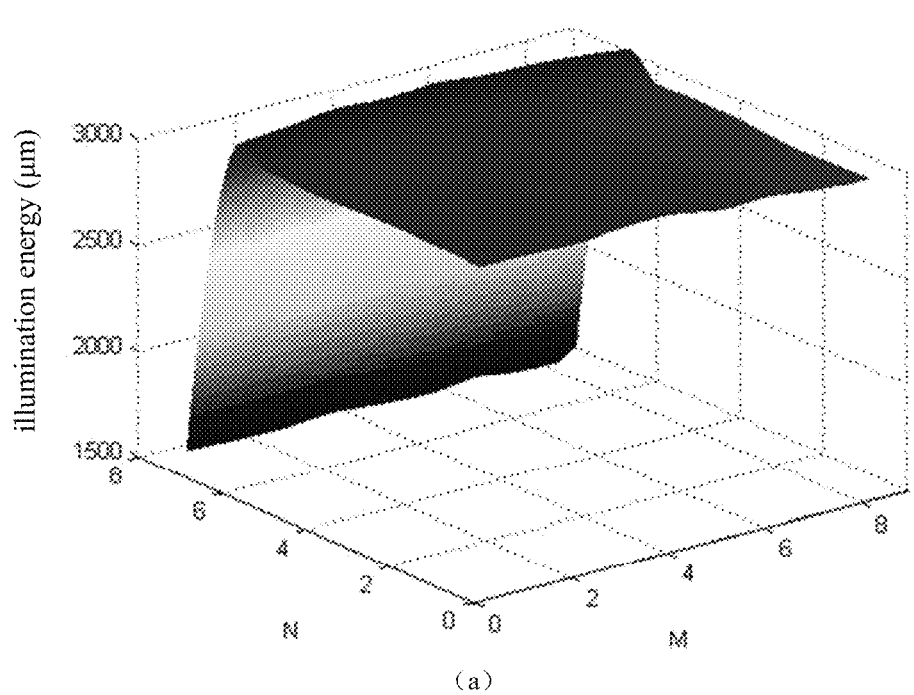
FIGS. 7 (*a*) and (*b*) respectively show the distribution of energy of the upper and lower slice images after using the method.
Figure 7:
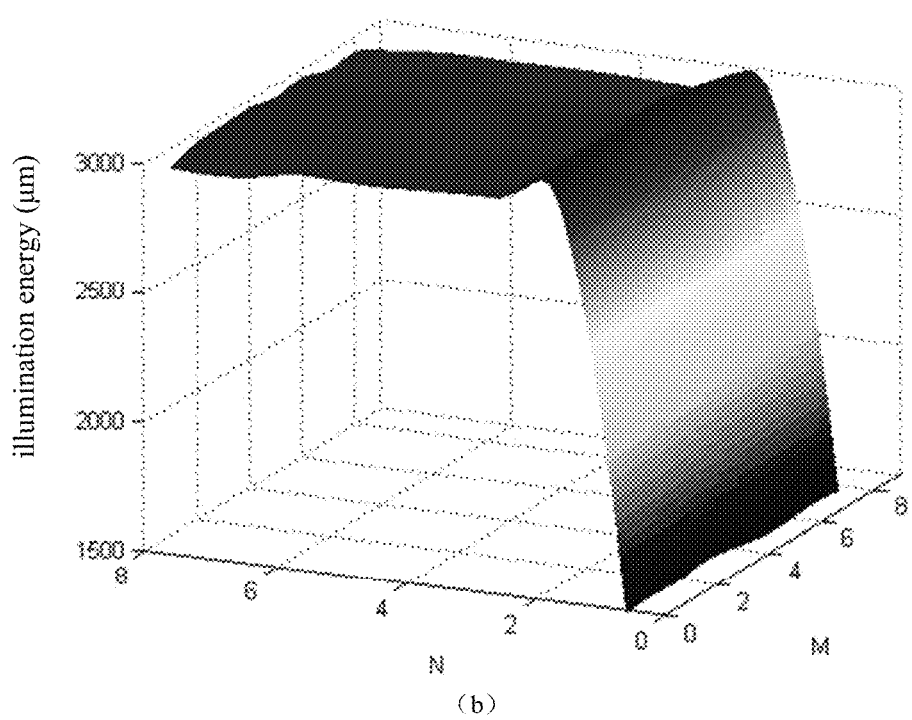

Substep 340: Linear interpolation the two gray leveled images that have been generated, then the two gray leveled pictures with smooth gray changes can be obtained. FIG. 6 shows the projection energy irradiance distribution of the projector when the gray levels of the image is 255. FIGS. 7(a) and (b) respectively show the distribution of energy of the upper and lower slice images after using the method.

Figure 8:
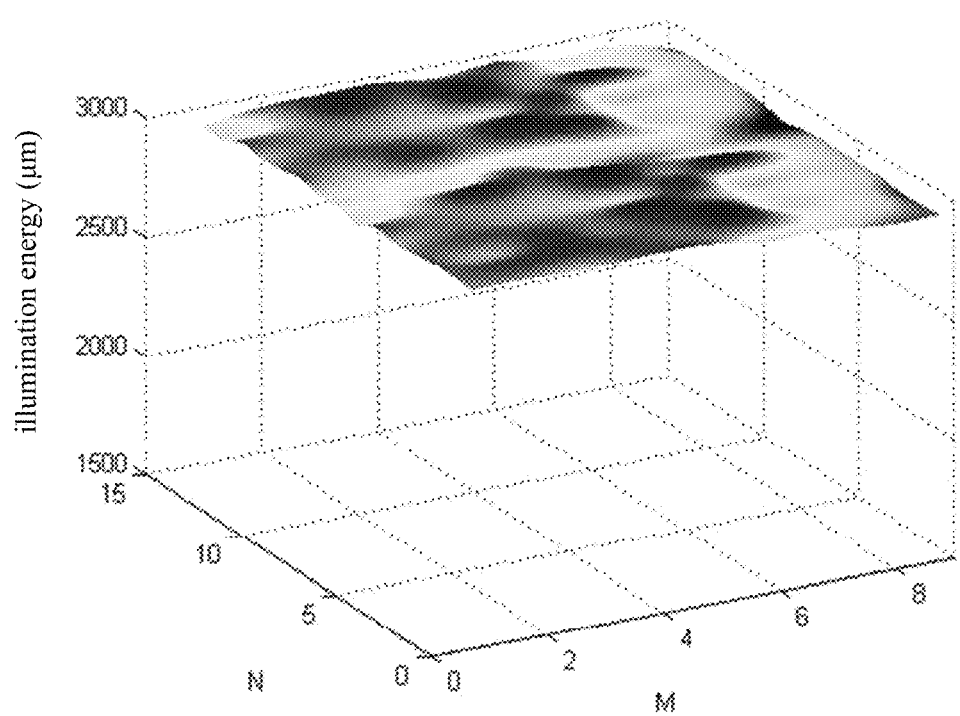
FIG. 8 shows the distribution of energy in the whole slice region using this method.

Step 400 includes:

Substep 410: Sequentially scans the gray value of each pixel in the interpolated gray level image and skips the next pixel if the gray level value is zero. If the gray value is greater than zero, obtain the gray value of the pixel, then the gray value is assigned to the same pixel position of the original image slice. Finally the pixels of the segmented slices $P_1$ and $P_2$ are distributed in gray levels to satisfy the pixel gray distribution of the gray images $P_3$ and $P_4$, respectively. FIG. 8 shows the distribution of energy in the whole slice region using this method.

In the example described above, two projectors respectively project red and green pictures. However, it can be understood that the present invention is applicable in a more general sense to an image projected by an adjacent projector having a first color (pure color) and a second color (pure color) different from the first color. The first color and the second color have a significant color difference (for example, two of the three primary colors are used), but the attributes are the same, and the color of the overlapping area between the two is a third color that is different from the first and second colors.

Here, the picture attributes of the first color and the second color are the same, meaning that their size information and resolution information are the same.

In addition, examples of two projectors placed side by side above and below are described above, and the present invention is not limited to the specific examples and details described, instead, after modifying the previously described details, it can be applied to situations where projectors or other numbers of projectors are arranged in other ways.

An embodiment of the invention provides an energy homogenization method for large scale mask projection 3D printing using multiple projectors has the following advantages:

1) Improve the scale of exposure area;
2) Portability—when the projection mapping function of different light sources is acquired, the method can be easily transplanted;
3) Printability—this method of energy homogenization of multi-source large-scale mask projection 3D printing can be applied to most models that do not need to be optimized. It has strong applicability and high success rate of one-time printing. Therefore, the present invention has a certain application value and significance.

The invention claimed is:

1. An energy homogenization method for multiple-projector large-scale mask projection 3D printing comprising the steps of:

Step 100: using at least two projectors as a light-source for mask projection, and locating the projectors to be adjacent to each other so that there is an overlapped area between the projection areas of the projectors, wherein the two projectors project two images with the same property but with different pure colors, a first color and a second color, and the overlapped area between the projection areas of the projectors has a third color; then, using a camera to capture an image of the projection areas and the overlapped area, and analyzing the image using a computer, wherein the height and width of the overlapped area are denoted as $H_0$ and $W_0$ respectively;

Step 200: based on the information of the height $H_0$ and the width $W_0$ of the overlapped area, segmenting a preprocessed slice which is obtained from the captured image to create two slices which are denoted as $P_1$ and $P_2$ respectively; recording the width $W_1$ and $W_2$ and the $H_1$ and $H_2$ of the two slices $P_1$ and $P_2$; and then generating two corresponding gray leveled pictures $P_3$ and $P_4$ having the same property with the two slices;

Step 300: measuring the output energy at the same position on a printing area with discrete gray levels; by analyzing the measured data, obtaining a mapping function T[r(x, y)] by using curve fitting; and based on the mapping function T[r(x,y)], optimizing the generated pictures $P_3$ and $P_4$ using gray level interpolation; and Step 400: fusing the pictures $P_3$ and $P_4$ treated above with the two slices $P_1$ and $P_2$ to generate a series of 3D printed slices with energy homogenization.

2. The method of claim 1, wherein Step 100 comprises the substeps of:

testing and adjusting the levelness of the projectors by using a leveler so that the projectors have same projection orientation; then fixing these projectors so that their relative position is invariable;

activating the projectors to project images with different pure colors so that the overlap area between them has the third color which is a mixture of the two pure colors and can be identified by a computer; and using the camera to capture the image of the projection areas, including the areas with the two pure colors and that with the mixed color; obtaining details of the overlapped area based on the differences between image pixels; and recording the height and width of the overlapped area as $H_0$ and $W_0$ respectively.

3. The method of claim 1, wherein Step 200 comprises the substeps of:

zooming the slices to the size of the printing area with the invariable aspect ratio, and recording the height and width of the whole slice as H and W respectively;

segmenting the slice based on the height $H_0$ and width $W_0$ of the overlapped area, recording the segmented slices as $P_1$ and $P_2$, and recording their widths as $W_1$ and $W_2$ and their heights as $H_1$ and $H_2$; and generating two gray leveled images $P_3$ and $P_4$ with the same gray levels attributes with $P_1$ and $P_2$ based on the widths and heights of the two segmented slices $P_1$ and $P_2$.

4. The method of claim 1, wherein in Step 300:

for the power value at the same position with different gray levels, the complete projection mapping function is obtained through Fourier series curve fitting:

$$T[r(x,y)]=a_0+a_1*\cos(r(x,y)*w)+b_1*\sin(r(x,y)*w)$$

wherein r(x, y) is the gray level at location (x, y), w is angular frequency, and $a_0$ and $a_1$ are constants.

5. The method of claim 4, wherein according to the relationship of the overlapped area and projection mapping function of gray leveled images $P_3$, $P_4$, the illumination energy in the printing area of the gray leveled images $P_3$, $P_4$ are determined based on the following energy homogenization formula:

$$\begin{cases} r'(x,y) = \mathrm{argmin}\left(\displaystyle\sum_{(x,y)\in s_{max}} (f(T_1[r_1(x,y)] + T_2[r_2(x,y)]) - f)^2 - f\right) \\ f(T_1 + T_2) = \begin{cases} T_1[r_1(x,y)]_{(x,y)\in S_1} \\ T_2[r_2(x,y)]_{(x,y)\in S_2} \\ T_1[r_1(x,y)]_{(x,y)\in S_3} + T_2[r_2(x,y)]_{(x,y)\in S_3} \end{cases} \end{cases}$$

wherein section S1 is defined as an area that belongs to gray image $P_3$ without overlapped with $P_4$, section S2 is defined as an area that belongs to gray images $P_4$ without overlapped with $P_3$, section $S_3$ is defined as the overlapped area between gray images $P_3$ and $P_4$, $S_{max}$ is the maximum exposure area, and f is the average energy in the whole exposure area.

6. The method of claim 5, wherein for the energy homogenization formula, illumination unevenness of the exposure areas in sections $S_1$, $S_2$ and $S_3$ is reduced in the following way:
1) dividing sections $S_1$, $S_2$ and $S_3$ into M×N image sub-blocks respectively; for sections $S_1$ and $S_2$, using areas in the slice image as exposable areas; finding corresponding energy values from the obtained sub-areas of the image of the candidate area for exposure area; and selecting the minimum energy value as the optimal target energy value in the exposure area;
2) obtaining the illumination energy corresponding to the gray value of each pixel at the boundary of sections $S_1$ and $S_3$, and storing it in an array "A"; obtaining the illumination energy corresponding to the gray value of each pixel of the boundary of sections $S_2$ and $S_3$, and storing it in an array "B"; establishing two linear equations reflecting the change in the height or width in sections $S_3$; and determining the energy value of each position in section $S_3$ based on the combination of the energy values of the two linear equations at the same position.

7. The method of claim 6, wherein after the energy value of each position in the third section $S_3$ is determined, linear interpolation is performed in sections $S_1$ and $S_2$ respectively so that two gray level images with smooth gray changes are obtained.

8. The method of claim 7, wherein in Step 400:
the gray value of each pixel in the interpolated gray level image is sequentially scanned; the next pixel is skipped if the gray level value is zero; if the gray value is greater than zero, the gray value of the pixel is obtained, and then the gray value is assigned to the same pixel position of the original image slice; and finally, the pixels of the segmented slices $P_1$ and $P_2$ are distributed in gray levels to satisfy the pixel gray distribution of the gray images $P_3$ and $P_4$, respectively.

9. The method of claim 1, wherein by using a plurality of projectors of the same energy distribution as light sources of the mask projection 3D printer, Steps 100 to 400 and the corresponding sub-steps are performed for every two projectors adjacent in the height direction or/and in the width direction.

10. The method of claim 9, wherein for the energy values of the projected gray level images in the same position in different gray levels values, a complete projection mapping function is obtained through Fourier series curve fitting:

$$T[r(x,y)] = a_0 + a_1 * \cos(r*w) + b_1 * \sin(r*w)$$

wherein r(x, y) is a gray image at location (x, y), w is the angular frequency, and $a_0$ and $a_1$ are constants.

11. The method of claim 10, wherein the illumination power in the exposable areas of each slice is determined according to the relationship of the intersection positions of the slices and the projection mapping function and based on the following light power formula:

$$\begin{cases} r'(x,y) = \mathrm{argmin}\left(\displaystyle\sum_{(x,y)\in s_{max}} \left(f\left(\sum_{i=1}^{n} T_n[r_n(x,y)]\right) - f\right)^2 - f\right) \\ f\left(\displaystyle\sum_{i=1}^{n} T_n[r_n(x,y)]\right) = \begin{cases} T_n[r_n(x,y)]_{(x,y)\in S_n} \\ \displaystyle\sum_{i=1}^{n} T_n[r_n(x,y)]_{(x,y)\in S_m} \end{cases} \end{cases}$$

wherein f is the average energy at the locations in the printing area, $S_n$ is the sections without overlap, and $S_m$ is the overlapped section between the projectors.

* * * * *